US009953204B2

(12) United States Patent
Sundblad et al.

(10) Patent No.: US 9,953,204 B2
(45) Date of Patent: Apr. 24, 2018

(54) FINGERPRINT SENSING SYSTEM WITH SENSING REFERENCE POTENTIAL PROVIDING CIRCUITRY

(71) Applicant: Fingerprint Cards AB, Göteborg (SE)

(72) Inventors: Rolf Sundblad, Ljungsbro (SE); Emil Hjalmarson, Linköping (SE); Erik Säll, Linköping (SE); Allan Olsson, Spånga (SE); Klaas-Jan De Langen, Bergschenhoek (NL)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/399,124

(22) Filed: Jan. 5, 2017

(65) Prior Publication Data
US 2017/0308730 A1 Oct. 26, 2017

(30) Foreign Application Priority Data
Apr. 22, 2016 (SE) ...................... 1650548

(51) Int. Cl.
*G06K 9/00* (2006.01)
*H02M 3/07* (2006.01)
*G06K 9/03* (2006.01)

(52) U.S. Cl.
CPC ....... *G06K 9/0002* (2013.01); *G06K 9/00087* (2013.01); *G06K 9/03* (2013.01); *H02M 3/07* (2013.01)

(58) Field of Classification Search
CPC .................. H02M 3/07; H02M 3/156; H02M 2007/4835; G06F 3/0416; G06F 3/044;
(Continued)

(56) References Cited

U.S. PATENT DOCUMENTS 3,748,492 A * 7/1973 Baker ...................... G05F 1/62
307/117
5,778,089 A * 7/1998 Borza .................. G06K 9/0002
250/556
(Continued)

FOREIGN PATENT DOCUMENTS

EP 2 902 886 8/2015
EP 2 950 190 12/2015
(Continued)

OTHER PUBLICATIONS

The Swedish Search Report from Swedish Application No. 1650548-9, dated Dec. 15, 2016.

*Primary Examiner* — Andrew Moyer
*Assistant Examiner* — Dennis Rosario
(74) *Attorney, Agent, or Firm* — RMCK Law Group PLC

(57) ABSTRACT

A fingerprint sensing system comprising a device connection interface including a device reference potential input, a sensing arrangement, and sensing reference potential providing circuitry. The sensing arrangement includes multiple sensing structures and read-out circuitry connected to each of the sensing structures. The sensing reference potential providing circuitry provides a sensing reference potential to the sensing arrangement in the form of a sensing reference signal alternating between a first sensing reference potential and a second sensing reference potential, and comprises a first capacitor; a second capacitor; charging circuitry; and switching circuitry for alternatingly switching the sensing reference potential providing circuitry between a first state in which the first capacitor and the second capacitor are connected in parallel to the charging circuitry; and a second state in which the first capacitor and the second capacitor, when charged, are connected in series between the device reference potential input and the sensing arrangement.

15 Claims, 10 Drawing Sheets

(58) Field of Classification Search
CPC .......... G06F 3/041; G06F 2203/04101; G06K 9/0002; G06K 9/00053; G06K 19/0713; G02F 1/136213; H03K 2217/960725; H02J 7/025; H02J 7/0024
See application file for complete search history.

(56) References Cited

U.S. PATENT DOCUMENTS

| | | | |
|---|---|---|---|
| 6,016,355 A * | 1/2000 | Dickinson | G01B 7/004 324/678 |
| 7,129,714 B2 * | 10/2006 | Baxter | G01D 5/24 324/658 |
| 7,864,992 B2 | 1/2011 | Riedijk et al. | |
| 8,564,313 B1 | 10/2013 | Ryshtun et al. | |
| 8,654,506 B2 * | 2/2014 | Kawamoto | C04B 35/47 361/321.4 |
| 9,152,841 B1 | 10/2015 | Riedijk | |
| 2003/0174871 A1 | 9/2003 | Yoshioka et al. | |
| 2010/0106144 A1 * | 4/2010 | Matsumura | A61B 18/20 606/10 |
| 2012/0019265 A1 | 1/2012 | Yoshikawa | |
| 2015/0015537 A1 | 1/2015 | Riedijk et al. | |
| 2016/0078269 A1 | 3/2016 | Thornblom | |

FOREIGN PATENT DOCUMENTS

| | | |
|---|---|---|
| WO | WO 2009/090534 | 7/2009 |
| WO | WO 2015-183170 | 12/2015 |
| WO | WO 2016/058122 | 4/2016 |

* cited by examiner

FINGERPRINT SENSING SYSTEM WITH SENSING REFERENCE POTENTIAL PROVIDING CIRCUITRY

CROSS-REFERENCE TO RELATED APPLICATION

The present application is based on and claims the benefit of Swedish patent application Serial No. 1650548-9, filed Apr. 22, 2016, the content of which is hereby incorporated by reference in its entirety.

FIELD OF THE INVENTION

The present invention relates to a fingerprint sensing system, and to a method of sensing a fingerprint pattern.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

Among the various available fingerprint sensing principles (such as capacitive, optical, thermal, acoustic etc), capacitive sensing is most commonly used, in particular in applications where size and power consumption are important issues.

All capacitive fingerprint sensors provide a measure indicative of the capacitance between several sensing structures and a finger placed on or moved across the surface of the fingerprint sensor.

U.S. Pat. No. 7,864,992 discloses a fingerprint sensing system in which a driving signal is injected into the finger by pulsing a conductive structure arranged in the vicinity of the sensor array and measuring the resulting change of the charge carried by the sensing structures in the sensor array.

Although the fingerprint sensing system according to U.S. Pat. No. 7,864,992 provides for an excellent combination of fingerprint image quality and sensor protection, it would, in some applications be desirable to be able to acquire a high-quality fingerprint image without having to change the potential of the finger. In particular, there appears to be room for improvement for "difficult" fingers, such as dry fingers.

US 2015/0015537 discloses a fingerprint sensing system in which the reference potential of the sensor array is allowed to swing in relation to a device reference potential. Since the finger potential of a finger on the sensor array can be assumed to be constant or vary slowly in relation to the device reference potential, the swing of the reference potential of the sensor array can replace the swing of the finger potential used by the fingerprint sensing system according to U.S. Pat. No. 7,864,992. Since the approach according to US 2015/0015537 is practically independent of the conductivity of the finger, better results may be obtained for the above-mentioned "difficult" fingers.

U.S. Pat. No. 9,152,841 discloses another fingerprint sensing system in which the local reference potential of single sensing elements or groups of sensing elements is controlled to swing in relation to a device reference potential. According to U.S. Pat. No. 9,152,841, each sensing element comprises a sense transistor formed in a well, and the well is controlled to swing together with the sensing structure of the sensing element, to reduce the influence of parasitic capacitances.

It would be desirable to provide for even further improved fingerprint sensing, in particular through a thicker dielectric structure.

SUMMARY

In view of above-mentioned and other drawbacks of the prior art, it is an object of the present invention to provide an improved fingerprint sensing system, that provides for improved fingerprint sensing, in particular through a thicker dielectric structure.

According to a first aspect of the present invention, it is therefore provided a fingerprint sensing system for sensing a fingerprint pattern of a finger and providing a fingerprint pattern signal indicative of the fingerprint pattern, the fingerprint sensing system comprising: a device connection interface for connection of the fingerprint sensing system to an electronic device, the device connection interface including a device reference potential input for receiving a device reference potential from the electronic device; a sensing arrangement including: a plurality of sensing structures, each being covered by a dielectric structure and being arranged to capacitively couple to the finger when the finger is placed on the dielectric structure; and read-out circuitry connected to each of the sensing structures for sensing a change in charge carried by each of the sensing structures resulting from a change in potential difference between a finger potential of the finger and a sensing structure potential of the sensing structure, and forming the finger pattern signal based on the change in charge, the read-out circuitry being connected to each of the sensing structures in such a way that the sensing structure potential follows a sensing reference potential of the sensing arrangement; and sensing reference potential providing circuitry connected to the sensing arrangement for providing, to the sensing arrangement, the sensing reference potential in the form of a sensing reference signal alternating, in relation to the device reference potential, between a first sensing reference potential and a second sensing reference potential, a change in potential difference, in relation to the device reference potential, between the first sensing reference potential and the second sensing reference potential resulting in the change in potential difference between the finger potential and the sensing structure potential, wherein the sensing reference potential providing circuitry includes: a first capacitor; a second capacitor; charging circuitry for charging the first capacitor and the second capacitor; and switching circuitry connected to the first capacitor, the second capacitor, the charging circuitry, and the sensing arrangement for alternatingly switching the sensing reference potential providing circuitry between: a first state in which the first capacitor and the second capacitor are connected in parallel to the charging circuitry to allow the charging circuitry to charge the first capacitor and the second capacitor, and the sensing reference potential providing circuitry provides the first sensing reference potential to the sensing arrangement; and a second state in which the first capacitor and the second capacitor are disconnected from the charging circuitry and connected in series between the device reference potential input and the sensing arrangement, whereby the sensing reference potential providing circuitry provides the second sensing reference potential to the sensing arrangement.

The fingerprint pattern signal may be any signal, analog or digital, that is indicative of at least a part of the fingerprint pattern of the finger.

The device reference potential may be any reference potential for the electronic device, such as device ground (0 V in relation to device ground) or device supply voltage (such as 1.8 V in relation to device ground).

The electronic device may, for example, be a portable electronic device, such as a mobile phone, a smart watch, or a chip card (a so-called smart card). Furthermore, the electronic device may be a sub-system comprised in a more complex apparatus, such as a vehicle.

The read-out circuitry may include circuitry for converting analog signals to digital signals. Such circuitry may include at least one analog to digital converter circuit. In such embodiments, the fingerprint sensing system may thus provide the fingerprint pattern signal as a digital signal. In other embodiments, the fingerprint pattern signal may be provided as an analog signal.

The sensing structures may advantageously be provided in the form of metal plates, so that parallel plate capacitors are formed by the sensing structures (the sensing plates), the finger surface, and the dielectric structure covering the sensing structures (and any air that may locally exist between the finger surface and the dielectric structure).

The dielectric structure may advantageously be at least 20 μm thick and have a high dielectric strength to protect the underlying structures of the fingerprint sensing device from wear and tear as well as ESD (electrostatic discharge). Even more advantageously, the dielectric structure may be at least 50 μm thick. In embodiments, the dielectric structure may be several hundred μm thick. For instance, the dielectric structure may be at least partly constituted by a structural part of the electronic device, such as a cover glass or a laminate.

That the read-out circuitry is connected to each of the sensing structures in such a way that the sensing structure potential substantially follows the sensing reference potential of the sensing arrangement should be understood to mean that a change of the sensing reference potential results in a substantially corresponding change in the sensing structure potential. Depending on the configuration of the read-out circuitry, the sensing structure potential may be substantially the same as the sensing reference potential, or there may be a substantially constant potential difference between the sensing reference potential and the sensing structure potential.

It should be noted that the finger potential of the finger can generally be assumed to be substantially constant in relation to the device reference potential, at least during the time needed for the read-out circuitry to carry out a sensing operation. In embodiments, the fingerprint sensing system and/or the electronic device in which the fingerprint sensing system is comprised may include a conductive structure for connecting the finger, or another part of the user's hand, to the device reference potential. Such a conductive structure is not necessary for the fingerprint sensing system to operate satisfactory, but may enhance the performance of the fingerprint sensing system for certain fingers and/or use cases.

The charging circuitry may be any circuitry capable of adding charge to a first capacitor terminal of each of the first capacitor and the second capacitor when a second capacitor terminal of the each of the first capacitor and the second capacitor is connected to a substantially constant potential (preferably the same potential) in relation to the device reference potential.

In the first state—the charging state—the above-mentioned second capacitor terminal of each capacitor may advantageously be connected, by means of the switching circuitry, to device ground (to a device ground input comprised in the device connection interface).

In the second state—the boosting state—the first capacitor terminal of the first capacitor may advantageously be connected to device supply (to a device supply voltage input comprised in the device connection interface). The first capacitor terminal of the second capacitor may be connected to the second capacitor terminal of the first capacitor. As a result, the potential on the second capacitor terminal of the second capacitor will be a boosted potential. In the exemplary case where the first capacitor and the second capacitor are connected directly in series starting from the device supply potential, the potential at the second terminal will be the device supply potential plus two times the charging voltage of the first and second capacitors, in relation to the device ground potential.

To achieve a higher boosted potential (second sensing reference potential), the sensing reference providing circuitry may comprise additional capacitors, and the charging circuitry may be configured to connect the capacitors in parallel in the first state (charging state) and in series in the second state (boosting state) as described above.

The present invention is based upon the realization that improved fingerprint sensing performance, especially through a relatively thick dielectric structure, can be achieved by increasing the change in potential difference between the finger potential and the sensing structure potential. The present inventors have further realized that this can be achieved in a cost-efficient manner, while at the same time maintaining a low energy consumption of the fingerprint sensing system, by connecting at least two capacitors in parallel, charging the capacitors while they are connected in parallel, and then connecting the capacitors in series when they are charged to thereby provide a boosted potential to one or several sensing structures.

The approach according to embodiments of the present invention allows for the sensing reference potential providing circuitry to be included in an integrated circuit and obviates the need for relatively expensive and bulky dedicated voltage boosting components, such as an inductor or similar.

According to various embodiments of the fingerprint sensing system of the present invention, the read-out circuitry may comprise: a plurality of charge amplifiers, each being connected to at least one of the sensing structures for providing a sensing signal indicative of the change in charge carried by the at least one sensing structure, wherein each of the charge amplifiers comprises: a first input connected to the at least one sensing structure; a second input connected to the sensing reference potential providing circuitry to receive the sensing reference potential; an output providing the sensing signal; a feedback capacitor connected between the first input and the output; and at least one amplifier stage between the first and second inputs, and the output, wherein the charge amplifier is configured in such a way that a potential at the first input substantially follows the sensing reference potential at the second input.

Each charge amplifier converts charge at the first input (sometimes referred to as the negative input) to a voltage at the output. The gain of the charge amplifier is determined by the capacitance of the feedback capacitor.

That the charge amplifier is configured in such a way that the potential at the first input substantially follows the potential at the second input (sometimes referred to as the positive input) should be understood to mean that a change in the potential at the second input results in a substantially corresponding change in the potential at the first input. Depending on the actual configuration of the charge amplifier, the potential at the first input may be substantially the same as the potential at the second input, or there may be a substantially constant potential difference between the second input and the first input. If, for instance, the charge amplifier is configured as a single stage amplifier, the potential difference may be the gate-source voltage of the transistor of the single stage amplifier.

It should be noted that the output of the charge amplifier need not be directly connected to the feedback capacitor, and that there may be additional circuitry between the output and the feedback capacitor.

Advantageously, the read-out circuitry may further comprise sampling circuitry connected to the output of each of the charge amplifiers for sampling the sensing signals at sampling times being related to changes of the sensing reference potential between the first sensing reference potential and the second sensing reference potential.

In embodiments, the sampling circuitry may be controlled to sample the output a first time when the sensing reference potential is at either the first sensing reference potential or the second sensing reference potential, and a second time when the sensing reference potential is at the other one of the first sensing reference potential and the second sensing reference potential.

The procedure of sampling the sensing signal at first and second sampling times is generally referred to as correlated double sampling and removes much of the offset as well as at least low-frequency components of the common mode noise that the fingerprint sensing system may be subjected to.

Furthermore, each charge amplifier may comprise reset circuitry for equalizing the feedback capacitor at times related to the changes of the sensing reference potential from the first sensing reference potential to the second sensing reference potential, or from the second sensing reference potential to the first sensing reference potential.

The present inventors have found that it is beneficial to the performance of the fingerprint sensing system to be able to accurately and consistently control the charging of the first capacitor and the second capacitor comprised in the sensing reference potential providing circuitry. In particular, this provides for a consistent change in potential difference between the sensing structure potential and the finger potential for each sensing structure.

To that end, according to various embodiments of the fingerprint sensing system of the present invention, the charging circuitry may comprise at least one current generator for providing charge to the first capacitor and the second capacitor when the sensing reference potential providing circuitry is in the first state.

Advantageously, furthermore, the sensing reference potential providing circuitry may additionally comprise at least one voltage detector for detecting a voltage across at least one of the first capacitor and the second capacitor when the sensing reference potential providing circuitry is in the first state; and control circuitry connected to the at least one voltage detector and to the at least one current generator for controlling the at least one current generator to supply current until the voltage across at least one of the first capacitor and the second capacitor reaches a predefined charging voltage.

The voltage detector and control circuitry may be implemented in various ways known to one of ordinary skill in the art. For instance, the voltage detection may be carried out by a comparator, which may be connected to a switch for disconnecting the first capacitor and the second capacitor from the current generator when the voltage across at least one of the capacitors has reached a predefined value.

To allow interaction between the fingerprint sensing system and external circuitry regardless of how the sensing reference potential relates to the device reference potential, the fingerprint sensing system according to embodiments of the present invention may advantageously further comprise level shifting circuitry connected to the read-out circuitry, to the sensing reference potential and to the device reference potential input for receiving, from the read-out circuitry, the finger pattern signal referenced to the sensing reference potential, level shifting the finger pattern signal, and providing the finger pattern signal referenced to the device reference potential.

In various embodiments, the level shifting circuitry may further be configured to receive control signals referenced to the device reference potential from the device connection interface, and to provide the control signals referenced to the sensing arrangement reference potential, to the sensing arrangement. Accordingly, the level shifting circuitry may be bidirectional.

According to various embodiments, the level shifting circuitry may comprise a first level shifter and a second level shifter in sequence, the first level shifter being connected across the first capacitor and the second level shifter being connected across the second capacitor.

The first level shifter may shift a signal from being referenced to the potential at the first terminal of the first capacitor to being referenced to the potential at the second terminal of the first capacitor (which may be the same as the potential at the first terminal of the second capacitor). The second level shifter may receive the signal from the first level shifter and shift the signal from being referenced to the potential at the first terminal of the second capacitor to being referenced to the potential at the second terminal of the second capacitor. The voltage boosting configuration with charged capacitors in series allows for this kind of step-wise level shifting, which in turn provides for very fast level shifting. The fast level shifting enables fast operation of the fingerprint sensing system—in particular fast readout of the fingerprint pattern signal.

In embodiments where additional capacitors are used for modifying (boosting) the reference potential, additional level shifters may also be provided.

According to various embodiments, furthermore, the sensing reference potential providing circuitry may further comprise: a first ESD-protection circuit connected in parallel with the first capacitor when the sensing reference potential providing circuitry is in the first state and in the second state to protect the first capacitor from ESD-current; and a second ESD-protection circuit connected in parallel with the second capacitor when the sensing reference potential providing circuitry is in the first state and in the second state.

With a plurality of capacitors in series in the second state of the sensing reference potential providing circuitry, each capacitor will define a voltage domain in the sensing reference potential providing circuitry. The present inventors have realized that each capacitor is likely to be the weakest link in the case of an electrostatic discharge (ESD) event, and that an advantageous way of protecting the fingerprint sensing system from damage in the case of an ESD event would be to provide a chain of ESD-protection circuits, each being coupled between the first terminal and the second terminal of the first and second capacitors, at least when the sensing reference potential providing circuitry is in its second state.

In various embodiments of the fingerprint sensing system according to the present invention, the sensing arrangement may be included in a first integrated circuit; and the device connection interface and the sensing reference potential providing circuit may be included in a second integrated circuit coupled to the first integrated circuit.

In these embodiments, the first integrated circuit may further comprise a sensing arrangement interface; and the second integrated circuit may further comprise a sensor connection interface connected to the sensing arrangement interface.

The first integrated circuit (fingerprint sensor component) may be an SPI (Serial Peripheral Interface) slave, and the sensing arrangement interface may be an SPI port comprising a serial clock input (SCLK); a master output slave input (MOSI); a slave select input (CS); and a master input slave output (MISO).

According to various embodiments, the sensing arrangement, the device connection interface, and the sensing reference potential providing circuitry may be included in a single integrated circuit.

According to embodiments, moreover, the sensing arrangement, the device connection interface, and the sensing reference potential providing circuitry may be included in a single integrated circuit comprising a semiconductor substrate; and the at least one amplifier stage in each charge amplifier may comprise: a sense transistor having a gate constituting the first input, wherein the sense transistor is formed in a well in the semiconductor substrate, an interface between the well and the substrate being configured in such a way that current can be prevented from flowing between the well and the substrate, and wherein the well is connected to the sensing reference potential providing circuitry in such a way that a potential of the well substantially follows the sensing reference potential.

The semiconductor substrate may advantageously be a doped semiconductor substrate, and the well may be a portion of the substrate doped to opposite polarity with respect to the semiconductor substrate (if the semiconductor substrate is p-doped, the well may be n-doped, and if the semiconductor substrate is n-doped, the well may be p-doped. This is one way of achieving an interface between the well and the substrate that is configured in such a way that a current can be prevented from flowing between the well and the substrate. In particular, the well and the substrate may be kept at such electrical potentials that no current flows through the diode formed at the interface between the substrate and the well.

Alternatively, an insulating layer may be provided between the substrate and the well, for instance in the form of a thin layer of glass. Such an insulating layer will also prevent current from flowing between the well and the substrate.

The influence of the parasitic capacitance between sensing structure and semiconductor structures in the sensing arrangement can be considerably reduced by connecting the well to the sensing reference providing structure in such a way that the potential of the well substantially follows the sensing reference potential. Hereby, the potential difference between the well and the sensing structure can be kept substantially constant.

The fingerprint sensing system according to embodiments of the present invention may, furthermore, advantageously be included in an electronic device, further comprising processing circuitry configured to: acquire the fingerprint pattern signal from the fingerprint sensing system via the device connection interface; authenticate a user based on the fingerprint pattern signal; and perform at least one action only if the user is authenticated based on the fingerprint pattern signal.

According to a second aspect of the present invention, there is provided a method of sensing a fingerprint pattern of a finger using a fingerprint sensing system comprising: a device connection interface for connection of the fingerprint sensing system to an electronic device, the device connection interface including a device reference potential input for receiving a device reference potential from the electronic device; a sensing arrangement including: a plurality of sensing structures, each being covered by a dielectric structure and being arranged to capacitively couple to the finger when the finger is placed on the dielectric structure; and read-out circuitry connected to each of the sensing structures in such a way that the sensing structure potential follows a sensing reference potential of the sensing arrangement; and sensing reference potential providing circuitry connected to the sensing arrangement for providing the sensing reference potential to the sensing arrangement, the sensing reference potential providing circuitry includes a first capacitor; and a second capacitor, the method comprising the steps of: a) connecting the first capacitor and the second capacitor in parallel; b) charging the first capacitor and the second capacitor while the first capacitor and the second capacitor are connected in parallel; c) providing, while charging the first capacitor and the second capacitor, a first sensing reference potential to the sensing arrangement; d) sensing, by the read-out circuitry, a first charge carried by at least one of the sensing structures while the first sensing reference potential is provided to the sensing arrangement; e) connecting the charged first capacitor and the charged second capacitor in series between the device reference potential input and the sensing arrangement to change the sensing reference potential, in relation to the device reference potential, from the first sensing reference potential to a second sensing reference potential; f) sensing, by the read-out circuitry, a second charge carried by at least one of the sensing structures while the second sensing reference potential is provided to the sensing arrangement; and g) forming, by the read-out circuitry, a sensing signal for the at least one sensing structure indicative of a difference between the first charge and the second charge, wherein steps a) to g) are repeated until the sensing signal has been formed for each of the sensing structures.

It should be noted that the steps of the method according to various embodiments of the present invention need not necessarily be carried out in any particular order. For instance, steps a) to d) in sequence may be carried out before or after steps e) to f) in sequence. Accordingly, the sensing signal may be indicative of a change in charge resulting from a change from the first sensing reference potential to the second sensing reference potential, or from a change from the second sensing reference potential to the first sensing reference potential.

Further embodiments of, and effects obtained through this second aspect of the present invention are largely analogous to those described above for the first aspect of the invention.

In summary, the present invention relates to a fingerprint sensing system comprising a device connection interface including a device reference potential input, a sensing arrangement, and sensing reference potential providing circuitry. The sensing arrangement includes multiple sensing structures and read-out circuitry connected to each of the sensing structures. The sensing reference potential providing circuitry provides a sensing reference potential to the sensing arrangement in the form of a sensing reference signal alternating between a first sensing reference potential and a second sensing reference potential, and comprises a first capacitor; a second capacitor; charging circuitry; and switching circuitry for alternatingly switching the sensing reference potential providing circuitry between a first state in which the first capacitor and the second capacitor are connected in parallel to the charging circuitry; and a second state in which the first capacitor and the second capacitor, when charged, are connected in series between the device reference potential input and the sensing arrangement.

BRIEF DESCRIPTION OF THE DRAWINGS

These and other aspects of the present invention will now be described in more detail, with reference to the appended drawings showing an example embodiment of the invention, wherein:

FIG. 2b is a schematic block diagram of the fingerprint sensing system in FIG. 2a;

FIG. 5b is a schematic block diagram of the fingerprint sensing system in FIG. 5a;

DETAILED DESCRIPTION OF EXAMPLE EMBODIMENTS

In the present detailed description, various embodiments of the fingerprint sensing system and method according to the present invention are mainly described with reference to a fingerprint sensing system that is packaged to be connectable to an electronic device by a flexible printed circuit. Although this is convenient for many applications, it should be noted that many other kinds of electronics packages may be suitable for embodiments of the fingerprint sensing system depending on application. In embodiments, the fingerprint sensing system may also be unpackaged, or the electronic device may be a part of the packaging, such as may be the case when the electronic device is, for example, a smart card.

Figure 1:
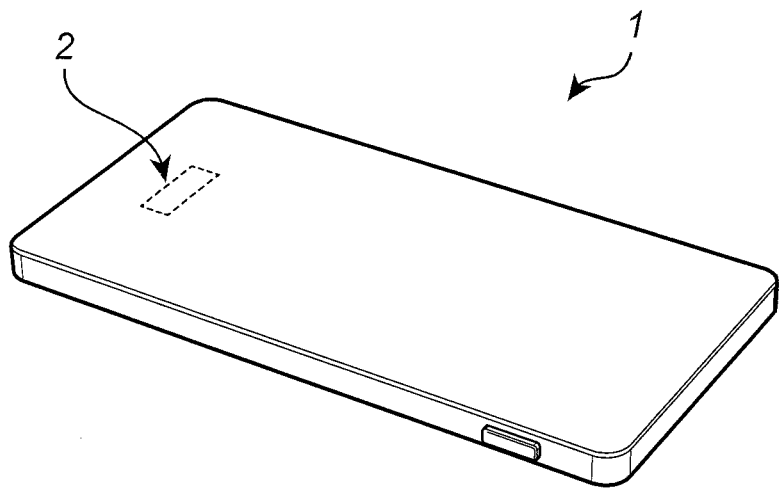
FIG. 1 schematically illustrates a mobile phone comprising a fingerprint sensing system according to an example embodiment of the present invention.

FIG. 1 schematically illustrates an application for a fingerprint sensing device according to an example embodiment of the present invention, in the form of a mobile phone 1 with an integrated fingerprint sensing system 2. The fingerprint sensing system 2 may, for example, be used for unlocking the mobile phone 1 and/or for authorizing transactions carried out using the mobile phone, etc.

Figure 2A:
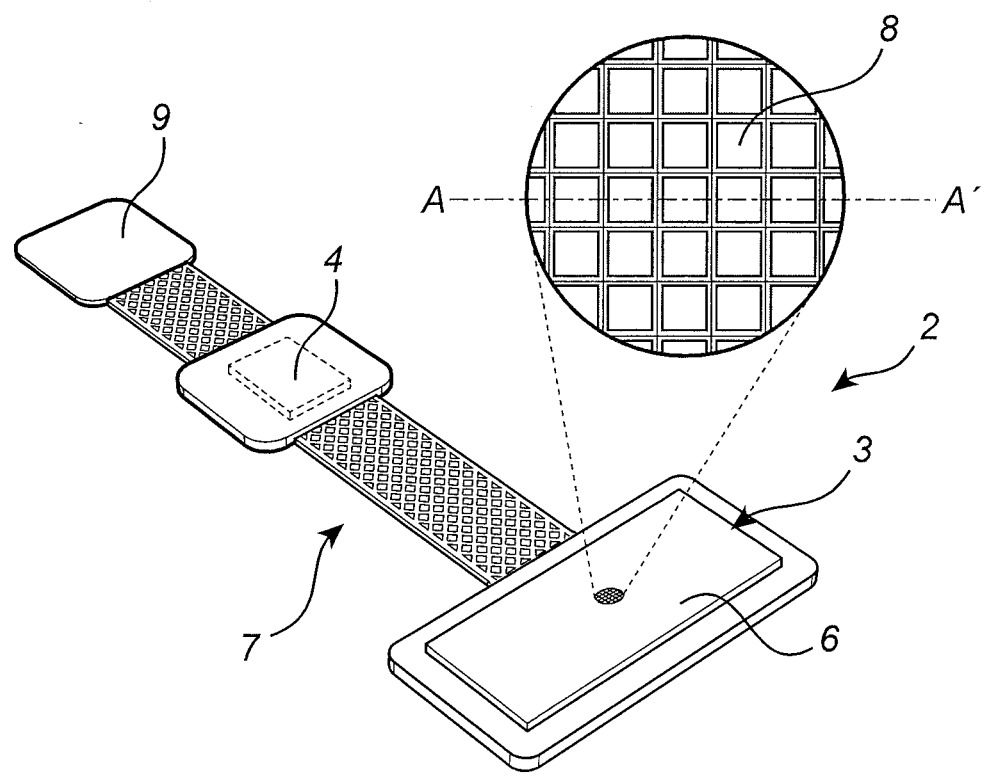
FIG. 2a schematically shows a first embodiment of the fingerprint sensing system comprised in the electronic device in FIG. 1.

FIG. 2a schematically shows a first embodiment of the fingerprint sensing system 2 comprised in the mobile phone 1 in FIG. 1. As can be seen in FIG. 2a, the fingerprint sensing system 2 comprises a fingerprint sensor 3 and an interface circuit 4. In the present exemplary embodiment, the fingerprint sensor 3 is shown to be coated with a dielectric structure in the form of a protective coating 6. Depending on the application, the protective coating 6 may have different properties. If the fingerprint sensor 3 is to be arranged under the cover glass of a mobile phone 1, then the protective coating 6 may be rather thin, since the cover glass will offer protection for the fingerprint sensor 3. In other applications, where the protective coating 6 is to be directly touched by the user's finger, the protective coating may be rather thick. For instance, the fingerprint sensor 3 may be overmolded by a suitable polymer used in the electronics packaging industry.

In the present exemplary embodiment, the fingerprint sensor 3 is connected to the interface circuit 4, and the interface circuit 4 is connectable to an electronic device (such as the mobile phone 1 in FIG. 1) via a flex circuit 7 with a connector 9.

As is schematically indicated in FIG. 2a, the fingerprint sensor 3 comprises a large number of sensing elements 8 (only one of the sensing elements has been indicated with a reference numeral to avoid cluttering the drawing), each being controllable to sense a distance between a sensing structure (top plate) comprised in the sensing element 8 and the surface of a finger contacting the top surface of the fingerprint sensor 3.

The fingerprint sensor 3 in FIG. 2 may advantageously be manufactured using CMOS technology, but other techniques and processes may also be feasible. For instance, an insulating substrate may be used and/or thin-film technology may be utilized for some or all process steps needed to manufacture the fingerprint sensor 3.

Figure 2B:
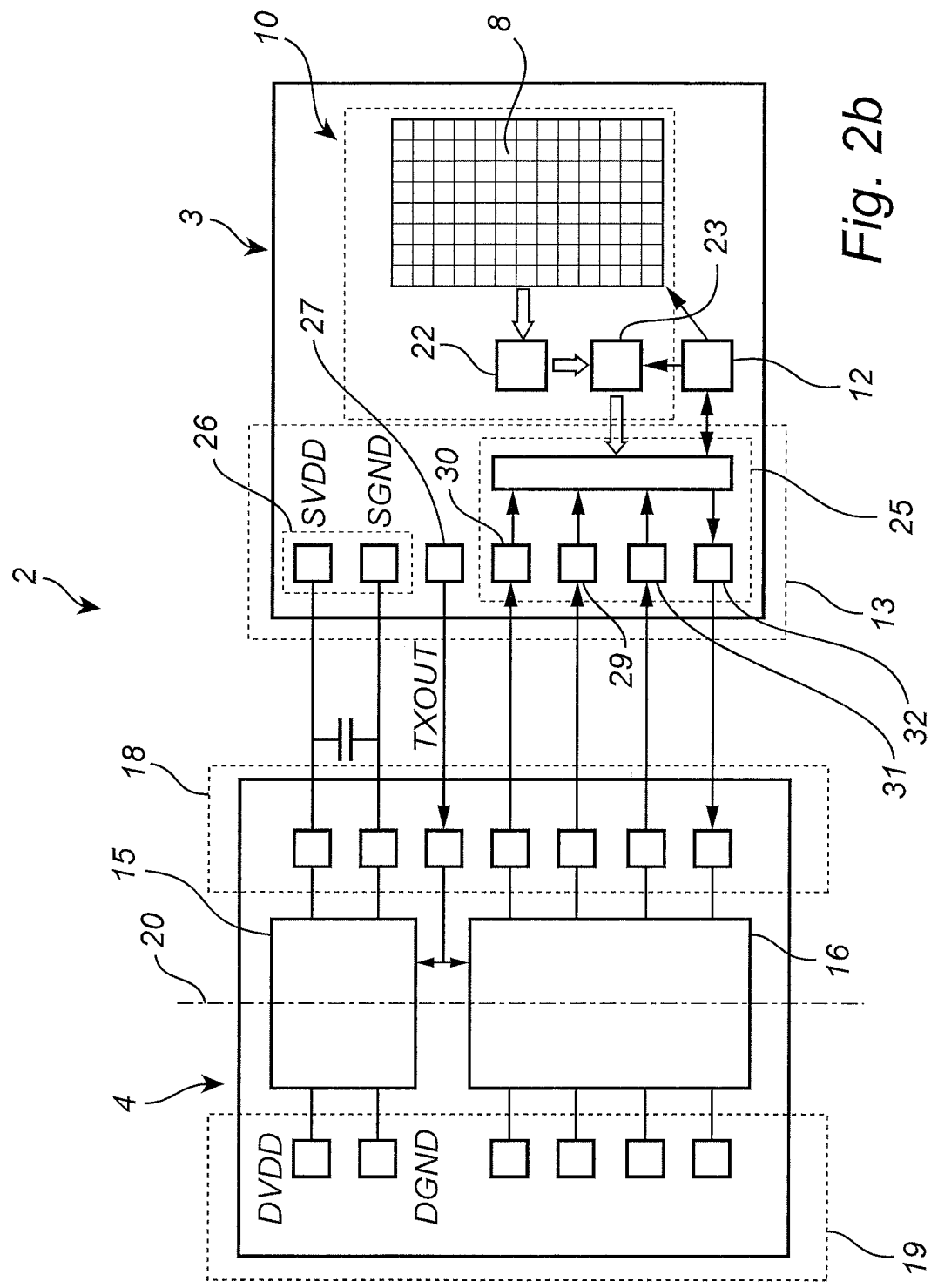

With reference to FIG. 2b, which is a simplified schematic block diagram of the first embodiment of the fingerprint sensing system 2 in FIG. 2a, the fingerprint sensor 3 comprises a sensing arrangement 10, a sensing arrangement controller 12, and a sensing arrangement interface 13. The interface circuit 4 comprises, as is indicated in FIG. 2b, sensing reference potential providing circuitry 15, level shifting circuitry 16, a sensor connection interface 18, and a device connection interface 19. The sensor connection interface 18 is in a first voltage domain of the interface circuit 4 having the same reference potential as the fingerprint sensor 3, and the device connection interface 19 is in a second voltage domain of the interface circuit 4 referenced to the device reference potential of the electronic device 1. The border between the first voltage domain and the second voltage domain is schematically indicated in FIG. 2b by the vertical dashed line 20 passing through the sensing reference potential providing circuitry 15 and the level shifting circuitry 16.

Turning again to the fingerprint sensor 3 in FIG. 2*b*, the sensing arrangement 10 comprises the above-mentioned sensing elements 8, sampling circuitry 22 for sampling sensing signals output by the sensing elements 8, and an analog-to-digital converter (ADC) 23 for converting the analog signal values sampled by the sampling circuitry 22 to digital values that may constitute a fingerprint pattern signal, such as a fingerprint image. The sensing arrangement interface 13 comprises a sensor communication interface 25, a sensor voltage supply interface 26, and timing output 27.

In the embodiment of FIGS. 2*a-b*, the sensor communication interface 25, which may for example, be an SPI slave interface, passes the fingerprint pattern signal from the ADC 23 to the electronic device via the interface circuitry 4, and sensor control signals originating from the electronic device to the sensing arrangement controller 12.

The sensor communication interface 25 is illustrated as a simplified SPI (serial peripheral interface) port comprising a serial clock input (SCK) 29, a master output slave input (MOSI) 30, a slave select input (CS) 31; and a master input slave output (MISO) 32.

The sensor voltage supply interface 26 receives a supply voltage from the interface circuit 4 as the substantially constant difference between a sensor ground potential SGND and a sensor supply potential SVDD. The sensor ground potential SGND and the sensor supply potential SVDD vary together in relation to device ground DGND.

Through the timing output 27, the fingerprint sensor 3 provides a timing signal TXOUT to the interface circuit 4, to allow the operation of the interface circuit to be timed with the operation of the sensing arrangement 10.

In the simplified example of FIG. 2*b*, the device connection interface 19 of the interface circuit 4 comprises inputs for receiving the device ground potential DGND and the device supply potential DVDD, and an SPI-interface for allowing communication between the electronic device and the fingerprint sensor 3 via the interface circuit 4 as well as between the electronic device and the interface circuit 4.

The sensor connection interface 18 of the interface circuit 4 is connected to the sensing arrangement interface 13 of the fingerprint sensor 3 for providing the sensor ground potential SGND and the sensor supply potential SVDD to the fingerprint sensor 3, for allowing communication with the fingerprint sensor 3 and for receiving the timing signal TXOUT provided by the sensor. As is schematically indicated in FIG. 2*b*, the timing signal TXOUT is used for controlling operation of the sensing reference potential providing circuitry 15 and the level shifting circuitry 16.

An example configuration of the sensing arrangement 10 and the provision of the fingerprint sensing signal from the sensing arrangement for the fingerprint sensing system in FIG. 2*a* will now be described with reference to FIG. 3.

Figure 3:
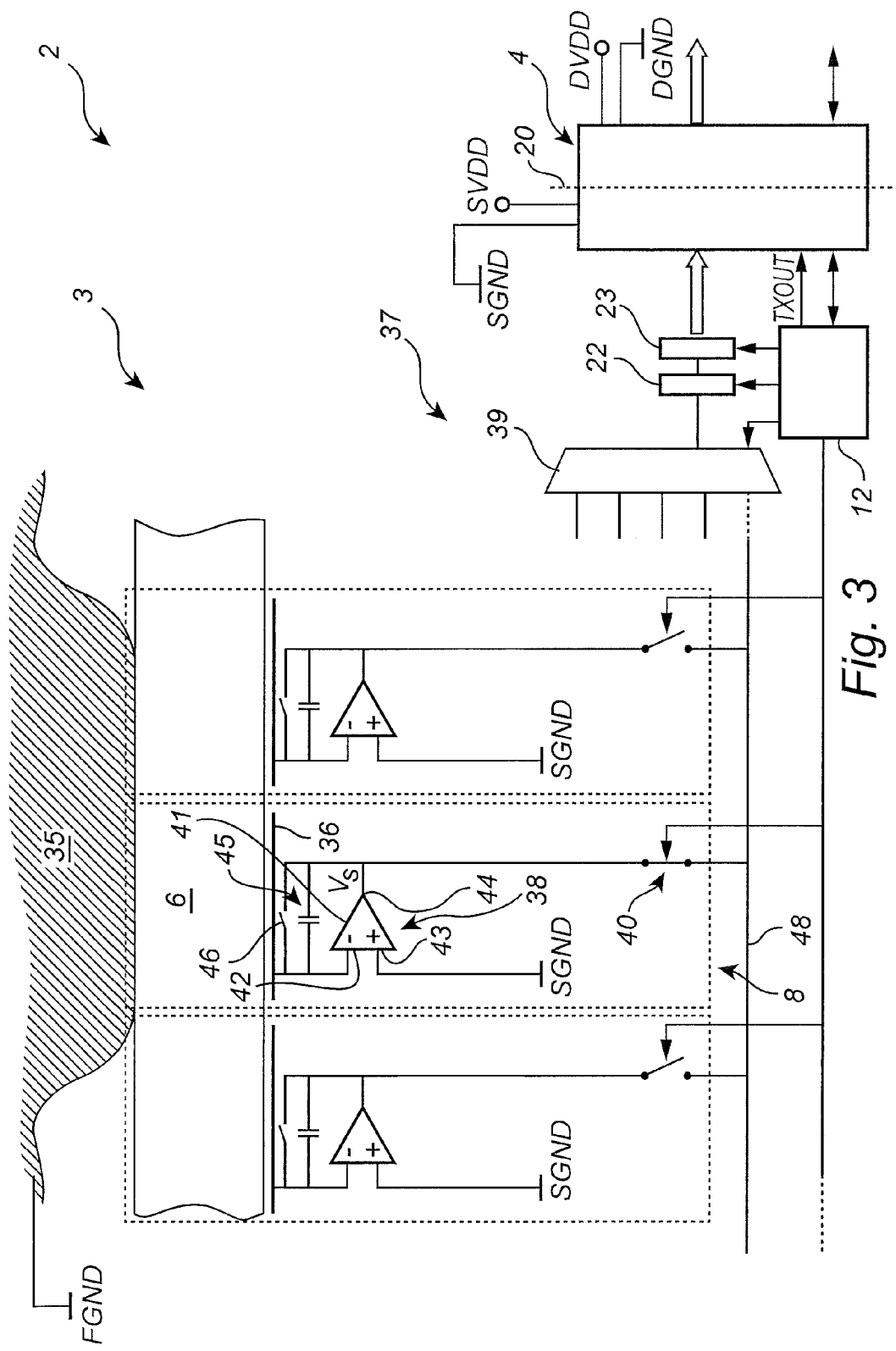
FIG. 3 is a schematic cross-section view of a portion of the fingerprint sensing system in FIG. 2a illustrating an example configuration of the sensing arrangement and the provision of the fingerprint sensing signal from the sensing arrangement.

FIG. 3 is a schematic cross section view of a portion of the fingerprint sensing system 2 in FIG. 2*a*, taken along the line A-A' as indicated in FIG. 2*a* with a finger 35 placed on top of the fingerprint sensor 3. The finger 35 has a finger potential FGND. As is schematically shown in FIG. 3, the fingerprint sensor 3 comprises a plurality of sensing structures 36, here in the form of metal plates underneath the dielectric structure 6, and read-out circuitry 37 connected to each of the sensing structures 36. In the example embodiment of FIG. 3, the read-out circuitry comprises a plurality of charge amplifiers 38, a multiplexer 39, the above-mentioned sampling circuitry 22, the above-mentioned ADC 23, and selection circuitry, here functionally illustrated as a simple selection switch 40 for allowing selection/activation of different sensing elements 8.

The charge amplifier 38 comprises at least one amplifier stage, here schematically illustrated as an operational amplifier (op amp) 41 having a first input (negative input) 42 connected to the sensing structure 36, a second input (positive input) 43 connected to sensor ground SGND, and an output 44. In addition, the charge amplifier 38 comprises a feedback capacitor 45 connected between the first input 42 and the output 44, and reset circuitry, here functionally illustrated as a switch 46, for allowing controllable discharge of the feedback capacitor 45. The charge amplifier 38 may be reset by operating the reset circuitry 46 to discharge the feedback capacitor 45.

As is often the case for an op amp 41, the potential at the first input 42 follows the potential applied to the second input 43. Depending on the particular amplifier configuration, the potential at the first input 42 may be substantially the same as the potential at the second input 43, or there may be a substantially fixed offset between the potential at the first input 42 and the potential at the second input 43.

In addition to the sensing arrangement comprising the sensing structures 36 and the read-out circuitry 37 as described above, the fingerprint sensor 3 further comprises the sensing arrangement controller 12 as described above. In FIG. 3, the sensing arrangement controller 12 is shown to control the selection circuitry 40, the multiplexer 39, the sampling circuitry 22 and the ADC 23.

FIG. 3 also schematically shows the interface circuit 4 connected to the fingerprint sensor 3 and to the rest of the electronic device as described above with reference to FIG. 2*a-b*. As is schematically indicated in FIG. 3, the interface circuit 4 provides the above-mentioned sensing reference potential (SGND and SVDD) to the fingerprint sensor 3. In the simplified example of FIG. 3, the sensor ground potential is provided to the second input 43 of each charge amplifier 38 comprised in the read-out circuitry 37.

At least when the fingerprint sensing system 2 is in a fingerprint sensing mode, the interface circuit 4 provides the sensing reference potential (SGND) to the fingerprint sensor 3 in the form of a sensing reference signal alternating, in relation to the device reference potential DGND, between a first sensing reference potential $V_L$ and a second sensing reference potential $V_H$. Since the finger potential FGND is substantially constant in relation to the device reference potential DGND (for example through an electrical connection between the electronic device and the hand of the user), and the potential of the sensing structure 36 substantially follows the potential at the second input 43 of the charge amplifier 38, the time-varying, in relation to the device reference potential DGND, potential SGND at the second input 43 results in a time-varying potential difference between the sensing structure 36 and the finger 35.

A change in potential difference between the sensing structure 36 and the finger 35 will in turn result in a change of the charge carried by the sensing structure 36 that is indicative of the capacitive coupling between the finger 35 and the sensing structure (plate) 36. The sensing signal $V_s$ provided at the output 44 of the charge amplifier 38 will be indicative of this change of charge carried by the sensing structure 36 and thus of the local capacitive coupling between the finger 35 and the sensing structure 36.

Between sensing operations, the feedback capacitor 45 needs to be reset (the charge across the feedback capacitor 45 is equalized). This is carried out using the reset switch 46.

When the indicated sensing element 8 is selected for sensing, the selection switch 40 is closed to connect the output of the charge amplifier to the readout line 48. The readout line 48 is connected to the multiplexer 39. As is schematically indicated in FIG. 3, additional readout lines providing sensing signals from other groups of sensing elements are also connected to the multiplexer 39.

At least the operation of the reset switch 46 and the sampling of the sensing signal $V_s$ need to be synchronized with changes of the sensor ground potential SGND in relation to the device ground potential DGND. In the example embodiment of FIG. 3, this synchronization is handled by the sensing arrangement controller 12 that controls the timing of the reset switch 46 and provides the above-mentioned timing signal TXOUT to the interface circuit to thereby control the timing of the transitions of the sensing reference potential SGND from the first sensing reference potential $V_L$ to the second sensing reference potential $V_H$, or from the second sensing reference potential $V_H$ to the first sensing reference potential $V_L$, in relation to the timing of the reset switch 46.

As is schematically indicated in FIG. 3, the sensing arrangement controller also controls the timing of the sampling of the sensing signal $V_s$ by the sampling circuit 22 and the A/D-conversion of the sampled sensing signals by the ADC 23.

An exemplary timing relation between sensing reference signal SGND, operation of the reset switch 46 and sampling of the sensing signal $V_s$ using the sampling circuit 22 will be described below with reference to FIGS. 4a-b.

Figure 4A:
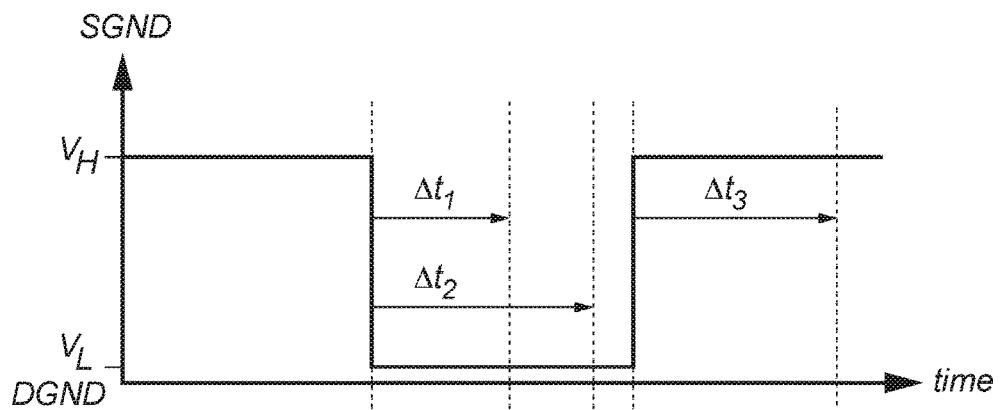
FIGS. 4a-b are graphs schematically illustrating the relation between the sensing reference potential and the sensing signal output by the charge amplifier in FIG. 3, as well as exemplary sampling times.
Figure 4B:
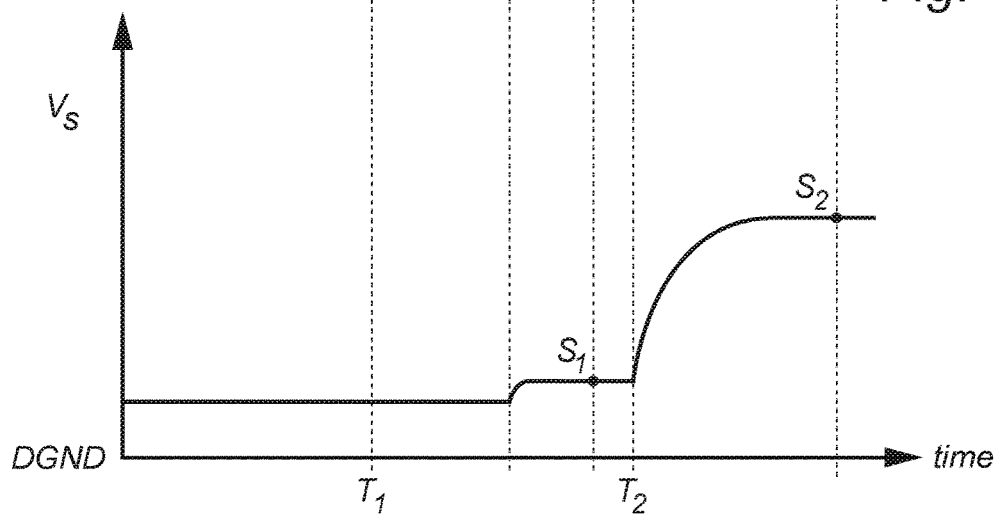

FIG. 4a shows the sensing reference potential (the sensor ground potential SGND) in relation to the device ground potential DGND. As described above, the potential of the sensing structure 36 in relation to the device ground potential DGND will exhibit substantially the same behavior, and FIG. 4b schematically shows the sensing signal $V_s$.

Referring first to FIG. 4a, the sensor ground potential SGND goes from the second sensing reference potential $V_H$ to the first sensing reference potential $V_L$, in relation to the device ground potential DGND, at $T_1$, and then goes back from $V_L$ to $V_H$ at $T_2$. These transitions are controlled by the timing signal TXOUT provided from the fingerprint sensor 3 to the interface circuit 4.

A first delay $\Delta t_1$ after first transition, at $T_1$, the reset switch 46 is operated to bring the charge amplifier 38 to such a state (enabled state) that the output provides a signal if the charge on the sensing plate 36 changes. A second delay $\Delta t_2$ after first transition, the sampling circuit 22 is controlled to sample the sensing signal a first time, resulting in a first sampled value $S_1$.

When the sensor ground potential SGND goes from low to high at $T_2$, there will be a change in the charge on the sensing plate 36 resulting from capacitive coupling with the finger 35. This change in charge is translated into a change in the voltage provided by the charge amplifier 38, that is, a change in the sensing signal $V_s$.

A third delay $\Delta t_3$ after the second transition, at $T_2$, the sampling circuit 22 is controlled to sample the sensing signal a second time, resulting in a second sampled value $S_2$. The difference between $S_2$ and $S_1$ is a measure indicative of the capacitive coupling between the sensing plate 36 and the finger 35.

Figure 5A:
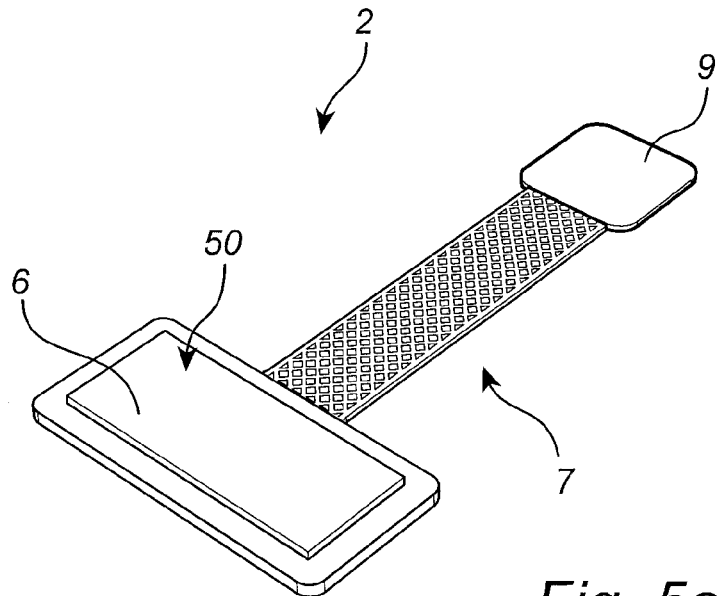
FIG. 5a schematically shows a second embodiment of the fingerprint sensing system comprised in the electronic device in FIG. 1.
Figure 5B:
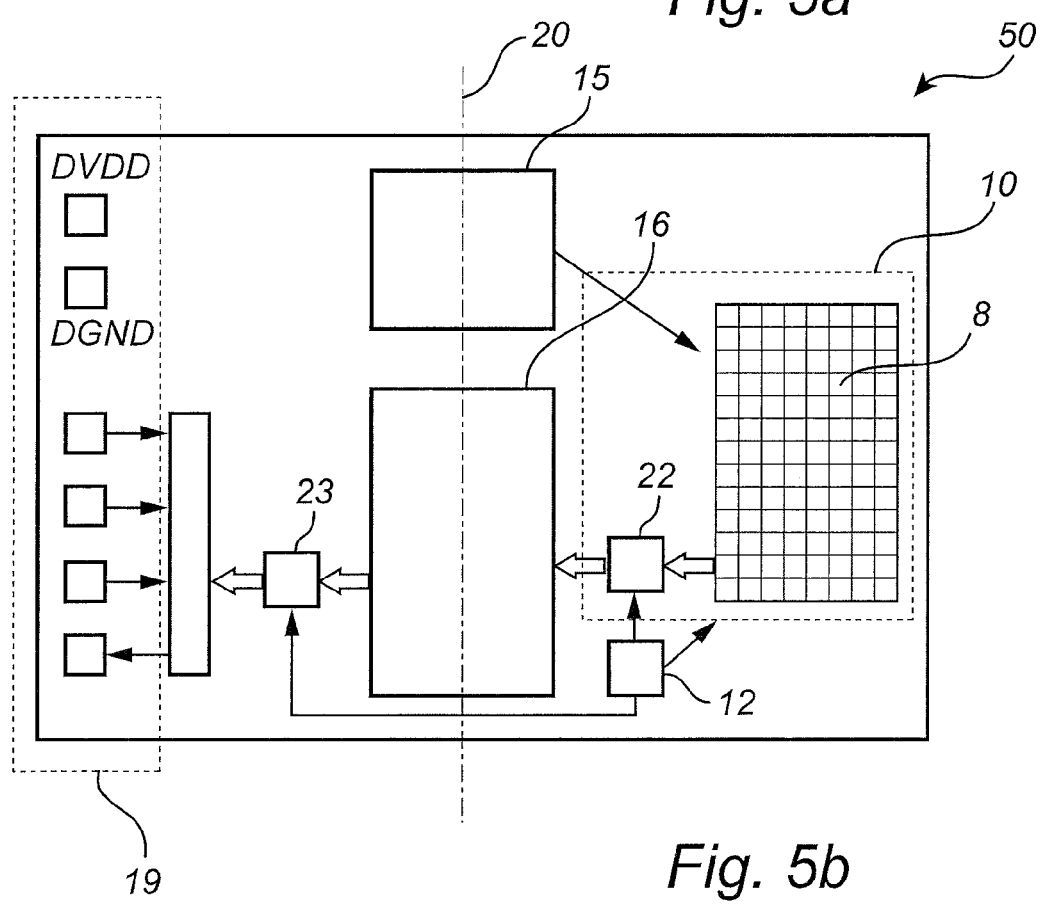

FIGS. 5a-b schematically show a second embodiment of the fingerprint sensing system 2 comprised in the mobile phone 1 in FIG. 1. The fingerprint sensing system 2 according to this second embodiment differs from that described above with reference to FIGS. 2a-b, FIG. 3 and FIGS. 4a-b in that the sensing arrangement 10, the device connection interface 19 and the sensing reference providing circuitry 15 are all included in a single integrated circuit 50. Accordingly signals to and from the electronic device are provided directly from the fingerprint sensing system component 50 to the electronic device via the flex circuit 7 and the connector 9.

With reference to FIG. 5b, which is a simplified schematic block diagram of the second embodiment of the fingerprint sensing system 2 in FIG. 5a, the fingerprint sensing system component 50 comprises a sensing arrangement 10, a sensing arrangement controller 12, sensing reference potential providing circuitry 15, level shifting circuitry 16, and a device connection interface 19. The sensing arrangement 10 and the sensing arrangement controller 12 are in a first voltage domain, and the device connection interface 19 and the ADC 23 are in a second voltage domain referenced to the device reference potential of the electronic device 1. The border between the first voltage domain and the second voltage domain is schematically indicated in FIG. 5b by the vertical dashed line 20 passing through the sensing reference potential providing circuitry 15 and the level shifting circuitry 16.

The sensing arrangement 10 comprises the above-mentioned sensing elements 8 and sampling circuitry 22 for sampling sensing signals output by the sensing elements 8. In the example embodiment of FIG. 5b, the values sampled by the sampling circuitry 22 are level shifted by the level shifting circuitry 16 before being provided to the analog-to-digital converter (ADC) 23.

In the embodiment of FIGS. 5a-b, the device connection interface 19 is illustrated as comprising inputs for receiving the device ground potential DGND and the device supply potential DVDD, and an SPI-interface for allowing communication between the electronic device and the fingerprint sensing system component 50.

An example configuration of the sensing arrangement 10 and the provision of the fingerprint sensing signal from the sensing arrangement for the fingerprint sensing system in FIGS. 5a-b will now be described with reference to FIGS. 6a-b.

Figure 6A:
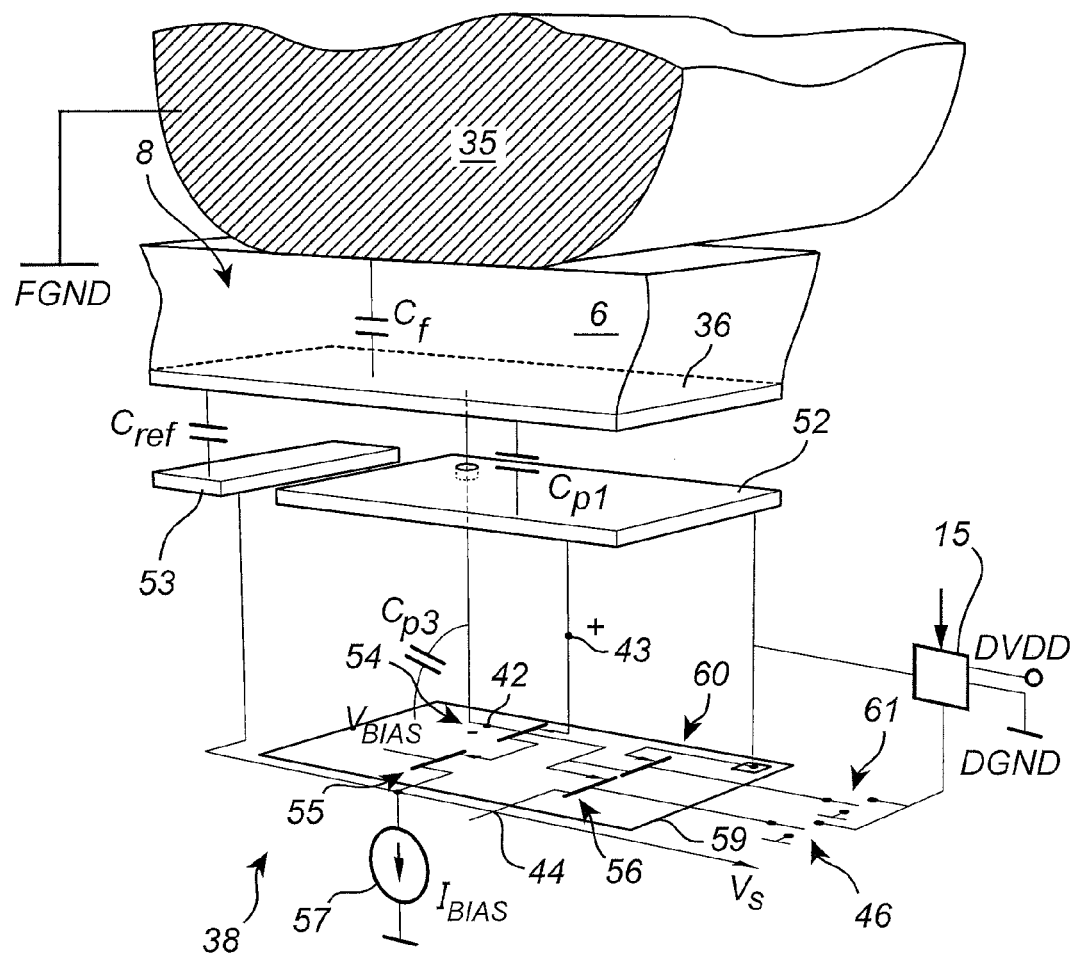
FIG. 6a is a hybrid of a partly structural and partly circuit schematic illustration of the sensing arrangement comprised in the fingerprint sensing device in FIGS. 5a-b.

FIG. 6a is a hybrid of a partly structural and partly circuit schematic illustration of a sensing element 8 comprised in the fingerprint sensing system component 50 in FIGS. 5a-b. The protective dielectric structure 6, the sensing plate 36, the shielding plate 52 and the reference plate 53 are schematically shown in an exploded perspective view, while the charge amplifier 38 is illustrated in the form of a transistor level circuit schematic.

As is shown in FIG. 6a, this first example of a simple charge amplifier 38 comprises sense transistor 54, cascode transistor 55, reset transistor 56 and bias current source 57. The sense transistor 54, the cascode transistor 55 and the reset transistor 56 are all formed in the same well 59.

Figure 6B:
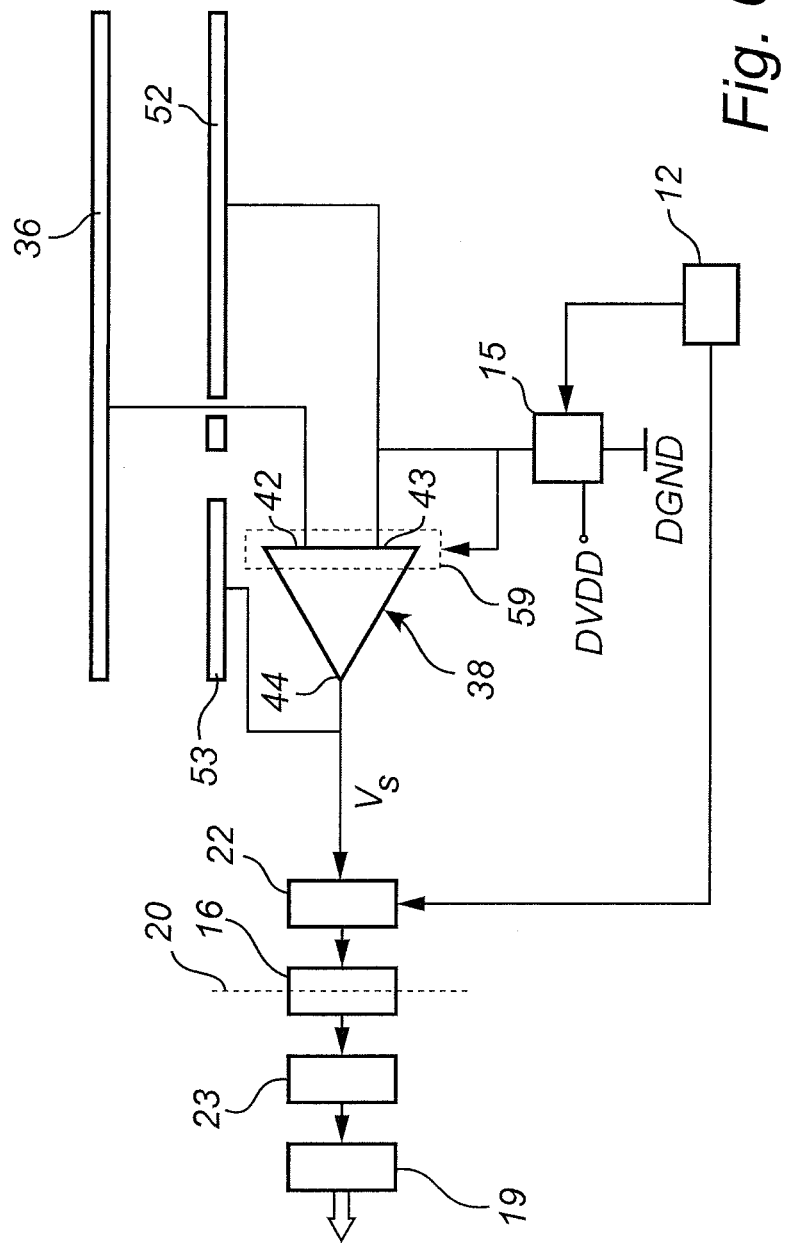
FIG. 6b is a version of FIG. 6a in which the charge amplifier is illustrated using a higher level symbol and the provision of the fingerprint sensing signal from the sensing arrangement is illustrated.

To aid the understanding of the parts and connections in FIG. 6a, the same schematic configuration is also shown in FIG. 6b, on a more abstract level with the transistor circuitry of FIG. 6a replaced by a general symbol for a charge amplifier having its first (negative) input 42 connected to the sensing plate 36, its positive input 43 connected to the sensing reference providing circuitry 15, and its output 44 providing a sensing signal $V_s$ indicative of the change in charge carried by the sensing plate 36 resulting from a change in a potential difference between the finger 35 and the sensing plate 36. FIG. 6b also schematically indicates that the well 59 is connected to the sensing reference potential providing circuitry 15.

Returning to FIG. 6a, it can be seen that the gate of the sense transistor 54 constitutes the negative input 42 of the charge amplifier 38 and that the source of the sense transistor 54 constitutes the positive input 43 of the charge amplifier 54. The positive input 43 is connected to the shielding plate 52, which is in turn connected to the well 59 in which the sense transistor 54 is formed, and to the sensing reference potential providing circuitry 15.

The sensing element 8 further comprises a drive transistor 60 a drive control switch 61 and a reset control switch 46. The drive control switch 61 is controllable between a first state in which the gate of the drive transistor 60 is connected to the sensing reference potential providing circuitry 15 and a second state in which the gate of the drive transistor 60 is connected to ground. When the drive control switch 61 is in its first state, the drive transistor 60 will be conducting and thus connect the sensing structure 36 directly to the sensing reference potential providing circuitry 15. When the drive control switch is in its second state, the drive transistor 60 will be non-conducting. In the latter case, there will thus be no direct connection through the drive transistor 60 between the sensing structure 36 and the sensing reference potential providing circuitry 15. As can be seen in FIG. 6a, the drive transistor 60 is formed in the well 59. The bias current source 57 can be in the sensing element or outside the sensor array.

In the same way, the reset control switch 46 is controllable between a first state in which the reset transistor 56 is non-conducting to allow a potential difference between the sensing plate 36 and the feedback plate 53, and a second state in which the reset transistor 56 is conducting to equalize the potentials of the sensing plate 36 and the feedback plate 53.

Through the configuration of the sensing element 8 in FIG. 6a, the influence of the internal parasitic capacitances $C_{p1}$ and $C_{p3}$ is removed or at least considerably reduced.

Having now described two exemplary embodiments of the fingerprint sensing system 2 according to the present invention on a system level, example configurations of the sensing reference potential providing circuitry 15 and the level shifting circuitry 16 will now be described in greater detail with reference to FIGS. 7a-b, FIG. 8, and FIG. 9.

Figure 7A:
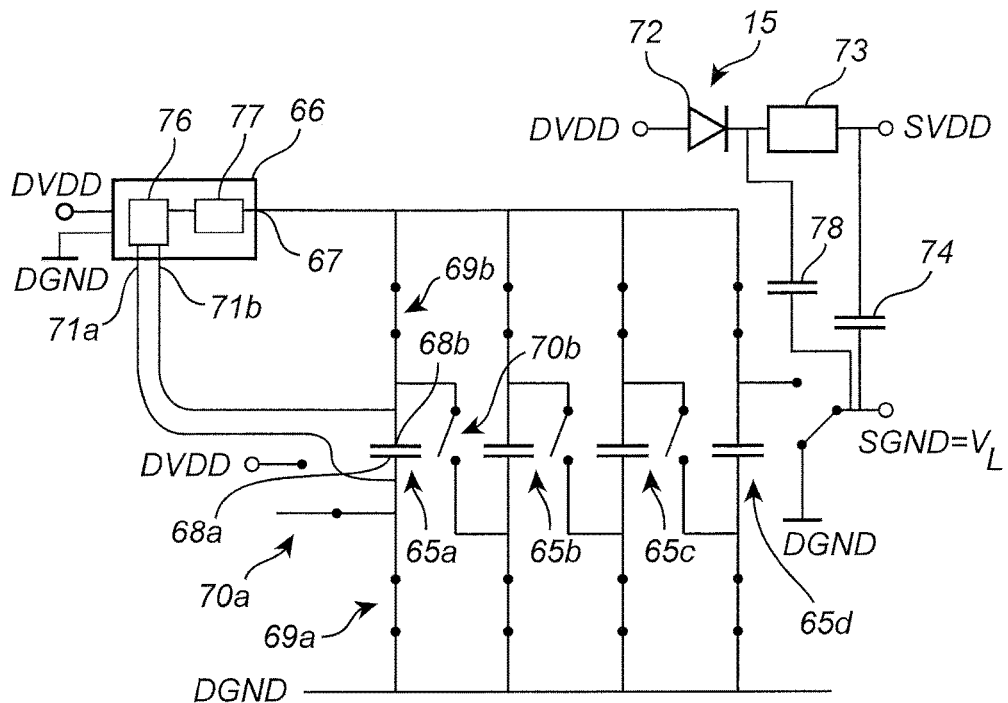
FIGS. 7a-b schematically illustrate an example configuration of the sensing reference potential providing circuitry comprised in the fingerprint sensing system according to various embodiments of the invention.

An example basic configuration of the sensing reference potential providing circuitry 15 comprised in embodiments of the fingerprint sensing system 2 according to the present invention will now be described with reference to the simplified circuit diagrams in FIGS. 7a-b. In FIG. 7a, the sensing reference potential providing circuitry 15 is shown in a first (charging) state, and in FIG. 7b, the sensing reference potential providing circuitry 15 is shown in a second (boosting) state.

Turning first to FIG. 7a, the sensing reference potential providing circuitry 15 comprises four booster capacitors 65a-d, a charging circuit 66, and switching circuitry indicated in FIG. 7a by a number of simple switch symbols.

Each of the booster capacitors 65a-d has a first capacitor terminal 68a and a second capacitor terminal 68b. These have only been indicated by reference numerals for the first booster capacitor 65a to avoid cluttering the drawings.

The charging circuit 66 has a charging output 67 connected to the first capacitor terminal 68a of each boosting capacitor 65a-d and voltage detection inputs 71a-b connected across the first boosting capacitor 65a.

The switching circuitry includes, as is schematically indicated in FIG. 7a, two charging enable switches 69a-b and two boosting enable switches 70a-b for each of the booster capacitors 65a-d. The charging enable switches 69a-b are controllable to allow connection of the first capacitor terminal 68a to device ground DGND, and connection of the second capacitor terminal 68b to the charging circuit 66. The boosting enable switches 70a-b are controllable to allow connection of the first capacitor terminal 68a to a booster floor potential for the booster capacitor 65a-d, and connection of the second capacitor terminal 68b to the next stage of the sensing reference potential providing circuitry 15 (or to the sensing reference potential output). Again, these switches have only been indicated by reference numerals for the first booster capacitor 65a to avoid cluttering the drawings.

As is also indicated in FIG. 7a, the sensing reference potential providing circuitry 15 further comprises a diode 72, a voltage regulator 73, such as a low-dropout regulator (LDO), a first capacitor 74 (smoothing capacitor), and a second capacitor 78.

Figure 7B:
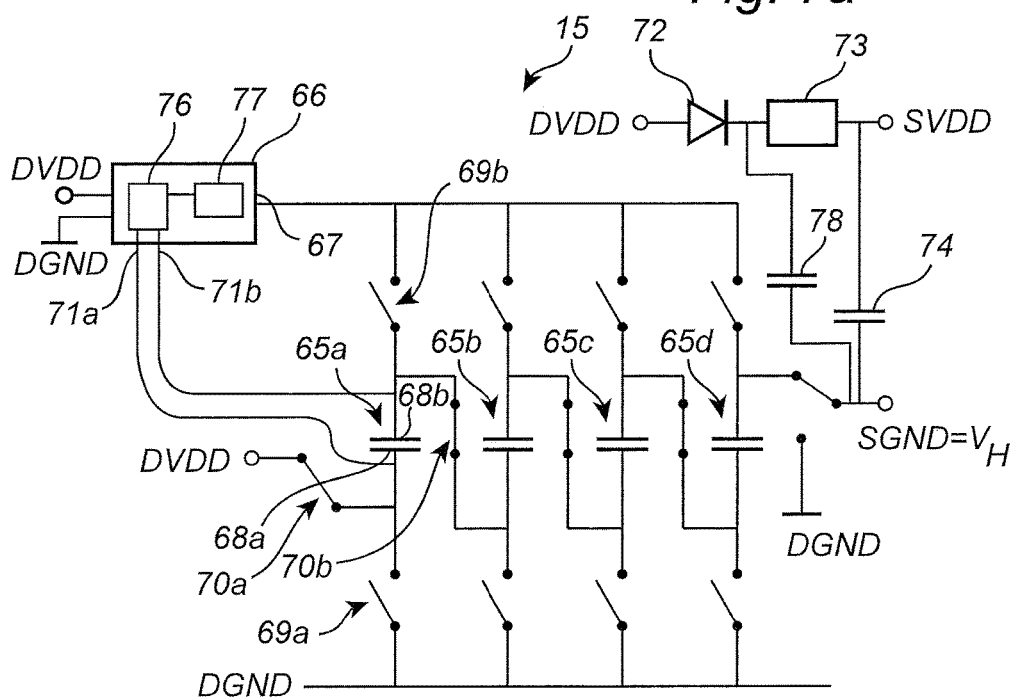

At least in active mode operation, the sensing reference potential providing circuitry 15 is controlled to alternate between a first state as is schematically indicated in FIG. 7a and a second state as is schematically indicated in FIG. 7b.

In the first state, the charging enable switches 69a-b are controlled to conductively connect the first capacitor terminal 68a of each boosting capacitor 65a-d to device ground DGND, and to conductively connect the second capacitor terminal 68b of each boosting capacitor 65a-d to the charging output 67 of the charging circuit 66. The boosting enable switches 70a-b are controlled to disconnect the respective boosting capacitors 65a-d from the previous and following stages of the sensing reference potential providing circuitry 15. Furthermore, sensing arrangement ground SGND is connected to device ground DGND to provide a first sensing reference potential $V_L$, in relation to device ground DGND, as the sensing arrangement ground SGND. In the first state of the sensing reference potential providing circuitry 15, the sensing arrangement supply potential SVDD is substantially equal to the device supply potential DVDD.

To ensure that the boosting capacitors 65a-d are charged to provide the same voltage boosting steps, the charging circuit 66 includes a voltage detector 76 for detecting the voltage across the boosting capacitors 65a-b and a controllable current source 77, which may be controlled to provide a constant charging current to the second capacitor terminal 68b of each boosting capacitor 65a-b until the voltage detector 76 detects a predefined charging voltage $V_{charge}$. For further improved performance, the charge on each of the boosting capacitors 65a-b may be individually monitored. In that case, the sensing reference providing circuitry 15 may include one charging circuit for each boosting capacitor.

When the boosting capacitors 65a-d have been charged to the charging voltage, the sensing reference potential providing circuitry 15 is ready to be switched to its second state—the boosting state. The timing of the transition from the first state to the second state may be controlled by the sensing arrangement, particularly by a timing signal (TX-OUT in FIGS. 2b and 3) that may be provided from the sensing arrangement to the sensing reference potential providing circuitry 15.

Referring now to FIG. 7b, which schematically shows the sensing reference potential providing circuitry 15 its second state, the charging enable switches 69a-b are controlled to disconnect the first capacitor terminal 68a of each boosting capacitor 65a-d from device ground DGND, and to disconnect the second capacitor terminal 68b of each boosting capacitor 65a-d from the charging output 67 of the charging circuit 66. The boosting enable switches 70a-b are controlled to connect the respective boosting capacitors 65a-d to the previous and following stages of the sensing reference potential providing circuitry 15 as is schematically indicated in FIG. 7b. Accordingly, the sensing arrangement ground SGND is connected to the second capacitor terminal of the fourth boosting capacitor 65d to provide a second sensing reference potential $V_H$, in relation to device ground DGND, as the sensing arrangement ground SGND. In the second state of the sensing reference potential providing circuitry 15, the sensing arrangement supply potential SVDD is substantially equal to the device supply potential DVDD plus the second sensing reference potential $V_H$. The second sensing reference potential $V_H$ is, in the simplified example of FIGS. 7a-b, approximately DVDD plus four times the charging voltage $V_{charge}$, in relation to device ground DGND.

In the second state, the diode 72 prevents current from flowing from SVDD towards DVDD, and SVDD is raised by means of the capacitor 78 keeping the potential difference between SGND and SVDD substantially constant.

Figure 8:
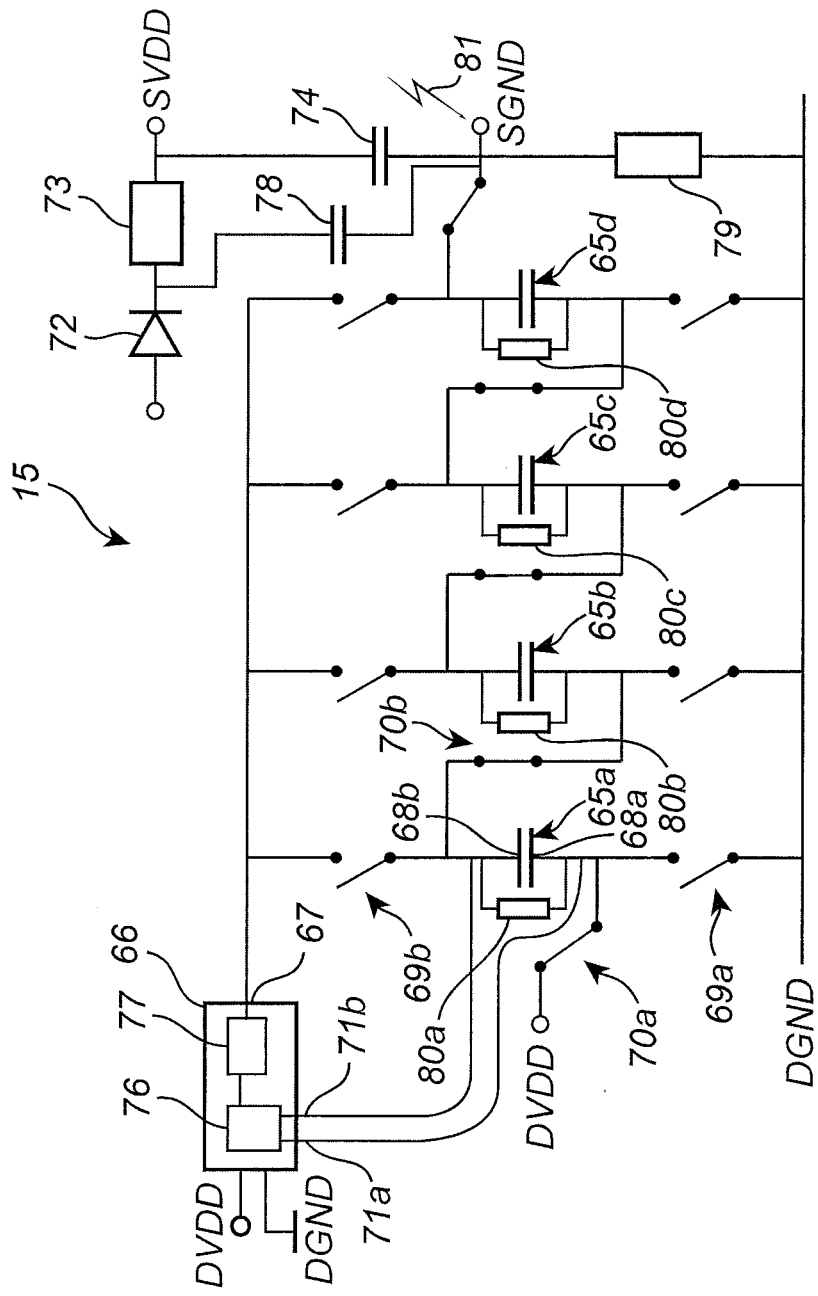
FIG. 8 schematically shows an ESD protection configuration for the sensing reference potential providing circuitry in FIGS. 7a-b.

FIG. 8 schematically shows an ESD protection configuration for the sensing reference potential providing circuitry 15 in FIGS. 7a-b. The sensing reference potential providing circuitry 15 in FIG. 8 is shown to be in the second state (same as in FIG. 7b) and ESD-protection components have been indicated in the simplified circuit diagram. A first ESD-protection component 79 is provided at the output of the sensing reference potential providing circuitry 15 between sensing arrangement ground SGND and device ground DGND. To provide improved protection in the case of an ESD-event, such as that schematically indicated by the flash 81 in FIG. 8, the sensing reference potential providing circuitry 15 comprises additional ESD-protection components 80a-d coupled between the first capacitor terminal 68a and the second capacitor terminal 68b of each booster capacitor 65a-d to thereby protect the booster capacitors 65a-d from being damaged by an ESD-event 81 that may not trig the first ESD-protection component but that may still be harmful for the low voltage components in the different internal voltage domains of the sensing reference potential providing circuitry 15.

Suitable ESD-protection components are, per se, well known to one of ordinary skill in the art.

Figure 9:
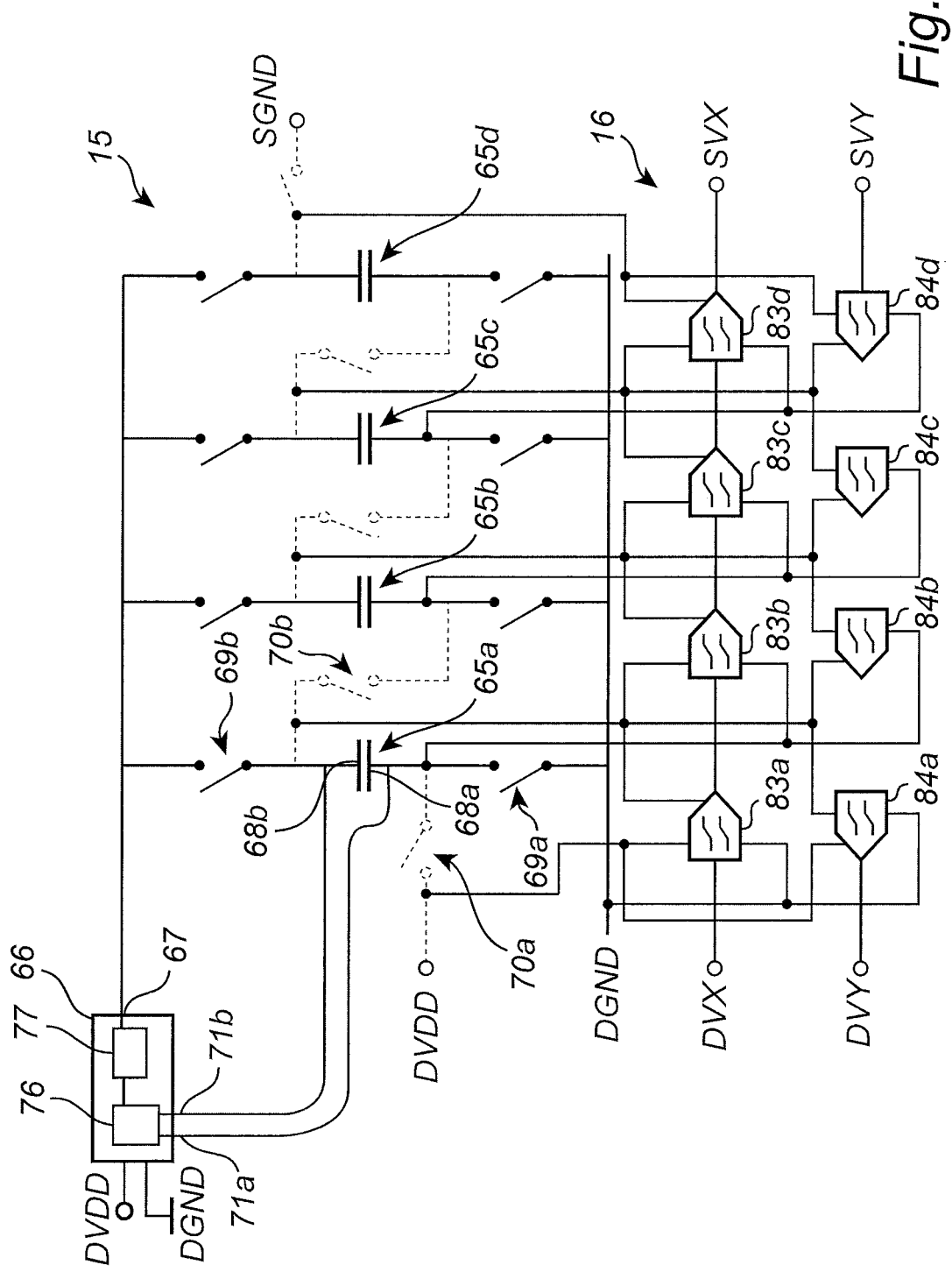
FIG. 9 schematically illustrates an example configuration of combined sensing reference potential providing circuitry and level shifting circuitry.

FIG. 9 schematically illustrates a simplified example configuration of combined sensing reference potential providing circuitry 15 and level shifting circuitry 16. As is schematically shown in FIG. 9, the level shifting circuitry 16 comprises a first set of level shifters 83a-d in sequence from the device voltage domain (represented by device ground DGND) to the sensing arrangement voltage domain (represented by sensing arrangement ground SGND), and a second set of level shifters 84a-d in sequence from the sensing arrangement voltage domain to the device voltage domain.

Referring to the first set of level shifters 83a-d, each level shifter shifts the reference potential for an input signal by the voltage across the booster capacitor ($V_{charge}$), and the output of one level shifter 83a is connected to the input of the next level shifter 83b in the sequence. Hereby, very fast level shifting can be achieved, which is important for fast read-out of the fingerprint pattern signal from the sensing arrangement. The second set of level shifters 84a-d works in the same way as the first set of level shifters.

As will be appreciated by the skilled person, each of the level shifters can be realized in various, per se, known ways.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A fingerprint sensing system for sensing a fingerprint pattern of a finger, said fingerprint sensing system comprising:
    a device connection interface for connection of said fingerprint sensing system to an electronic device, said device connection interface including a device reference potential input for receiving a device reference potential from said electronic device;
    a sensing arrangement including:
    a plurality of sensing structures, each being covered by a dielectric structure; and
    read-out circuitry connected to each of said sensing structures for providing sensing signals indicative of a capacitive coupling between each sensing structure and said finger in response to a change in potential difference between a finger potential of said finger and a sensing structure potential of said sensing structure, said read-out circuitry being connected to each of said sensing structures in such a way that said sensing structure potential follows a sensing reference potential of said sensing arrangement; and
    sensing reference potential providing circuitry connected to said sensing arrangement for providing, to said sensing arrangement, said sensing reference potential in the form of a sensing reference signal alternating, in relation to said device reference potential, between a first sensing reference potential and a second sensing reference potential, wherein said sensing reference potential providing circuitry includes:
    a first capacitor;
    a second capacitor;
    charging circuitry for charging said first capacitor and said second capacitor; and
    switching circuitry connected to said first capacitor, said second capacitor, said charging circuitry, and said sensing arrangement for alternatingly switching said sensing reference potential providing circuitry between:
    a first state in which said first capacitor and said second capacitor are connected in parallel to said charging circuitry to allow said charging circuitry to charge said first capacitor and said second capacitor, and said sensing reference potential providing circuitry provides said first sensing reference potential to said sensing arrangement; and
    a second state in which said first capacitor and said second capacitor are disconnected from said charging circuitry and connected in series between said device reference potential input and said sensing arrangement, whereby said sensing reference potential providing circuitry provides said second sensing reference potential to said sensing arrangement.

2. The fingerprint sensing system according to claim 1, wherein said read-out circuitry comprises:
    a plurality of charge amplifiers, each being connected to at least one of said sensing structures for providing a sensing signal, wherein each of said charge amplifiers comprises:
    a first input connected to said at least one sensing structure;
    a second input connected to said sensing reference potential providing circuitry to receive said sensing reference potential;
    an output providing said sensing signal;

a feedback capacitor connected between said first input and said output; and at least one amplifier stage between said first and second inputs, and said output, wherein said charge amplifier is configured in such a way that a potential at said first input substantially follows said sensing reference potential at said second input.

3. The fingerprint sensing system according to claim 2, wherein said read-out circuitry further comprises:
sampling circuitry connected to the output of each of said charge amplifiers for sampling said sensing signals at sampling times being related to changes of said sensing reference potential between said first sensing reference potential and said second sensing reference potential.

4. The fingerprint sensing system according to claim 1, wherein said charging circuitry comprises at least one current generator for providing charge to said first capacitor and said second capacitor when the sensing reference potential providing circuitry is in said first state.

5. The fingerprint sensing system according to claim 4, wherein said sensing reference potential providing circuitry further comprises:
at least one voltage detector for detecting a voltage across at least one of said first capacitor and said second capacitor when the sensing reference potential providing circuitry is in said first state; and
control circuitry connected to said at least one voltage detector and to said at least one current generator for controlling said at least one current generator to supply current until the voltage across at least one of said first capacitor and said second capacitor reaches a predefined charging voltage.

6. The fingerprint sensing system according to claim 1, wherein said fingerprint sensing system further comprises level shifting circuitry connected to said read-out circuitry, to said sensing reference potential and to said device reference potential input for receiving, from said read-out circuitry, said finger pattern signal referenced to said sensing reference potential, level shifting said finger pattern signal, and providing said finger pattern signal referenced to said device reference potential.

7. The fingerprint sensing system according to claim 6, wherein said level shifting circuitry comprises a first level shifter and a second level shifter in sequence, said first level shifter being connected across said first capacitor and said second level shifter being connected across said second capacitor.

8. The fingerprint sensing system according to claim 1, wherein said sensing reference potential providing circuitry further comprises:
a first ESD-protection circuit connected in parallel with said first capacitor when said sensing reference potential providing circuitry is in said first state and in said second state (to protect said first capacitor from ESD-current); and
a second ESD-protection circuit connected in parallel with said second capacitor when said sensing reference potential providing circuitry is in said first state and in said second state.

9. The fingerprint sensing system according to claim 1, wherein:
said sensing arrangement is included in a first integrated circuit; and
said device connection interface and said sensing reference potential providing circuit are included in a second integrated circuit coupled to said first integrated circuit.

10. The fingerprint sensing system according to claim 9, wherein:
said first integrated circuit further comprises a sensing arrangement interface; and
said second integrated circuit further comprises a sensor connection interface connected to said sensing arrangement interface.

11. The fingerprint sensing system according to claim 1, wherein:
said sensing arrangement, said device connection interface, and said sensing reference potential providing circuitry are included in a single integrated circuit.

12. The fingerprint sensing system according to claim 2, wherein:
said sensing arrangement, said device connection interface, and said sensing reference potential providing circuitry are included in a single integrated circuit comprising a semiconductor substrate; and
said at least one amplifier stage comprises:
a sense transistor having a gate constituting said first input,
wherein said sense transistor is formed in a well in said semiconductor substrate, an interface between said well and said substrate being configured in such a way that current can be prevented from flowing between said well and said substrate, and
wherein said well is connected to said sensing reference potential providing circuitry in such a way that a potential of said well substantially follows said sensing reference potential.

13. An electronic device comprising:
the fingerprint sensing system according to claim 1; and
processing circuitry configured to:
acquire a fingerprint pattern signal from the fingerprint sensing system via said device connection interface;
authenticate a user based on said fingerprint pattern signal; and
perform at least one action only if said user is authenticated based on said fingerprint pattern signal.

14. A method of sensing a fingerprint pattern of a finger using a fingerprint sensing system comprising:
a device connection interface for connection of said fingerprint sensing system to an electronic device, said device connection interface including a device reference potential input for receiving a device reference potential from said electronic device;
a sensing arrangement including:
a plurality of sensing structures, each being covered by a dielectric structure and being arranged to capacitively couple to said finger when said finger is placed on said dielectric structure; and
read-out circuitry connected to each of said sensing structures in such a way that said sensing structure potential follows a sensing reference potential of said sensing arrangement; and
sensing reference potential providing circuitry connected to said sensing arrangement for providing said sensing reference potential to said sensing arrangement, said sensing reference potential providing circuitry includes a first capacitor; and a second capacitor,
said method comprising the steps of:
a) connecting said first capacitor and said second capacitor in parallel;
b) charging said first capacitor and said second capacitor while said first capacitor and said second capacitor are connected in parallel;

c) providing, while charging said first capacitor and said second capacitor, a first sensing reference potential to said sensing arrangement;

d) sensing, by said read-out circuitry, a first charge carried by at least one of said sensing structures while said first sensing reference potential is provided to said sensing arrangement;

e) connecting said charged first capacitor and said charged second capacitor in series between said device reference potential input and said sensing arrangement to change said sensing reference potential, in relation to said device reference potential, from said first sensing reference potential to a second sensing reference potential;

f) sensing, by said read-out circuitry, a second charge carried by at least one of said sensing structures while said second sensing reference potential is provided to said sensing arrangement; and g) forming, by said read-out circuitry, a sensing signal for said at least one sensing structure indicative of a difference between said first charge and said second charge, wherein steps a) to g) are repeated until said sensing signal has been formed for each of said sensing structures.

15. The method according to claim 14, wherein said first capacitor and said second capacitor are charged until a potential difference across said first capacitor and said second capacitor in parallel reaches a predefined charging voltage.

* * * * *